(12) United States Patent
Masada et al.

(10) Patent No.: US 9,707,774 B2
(45) Date of Patent: Jul. 18, 2017

(54) INK JET IMAGE RECORDING METHOD, INK SET, AND INK SET PREPARATION METHOD

(71) Applicant: CANON KABUSHIKI KAISHA, Tokyo (JP)

(72) Inventors: Yohei Masada, Tokyo (JP); Masahiro Terada, Hadano (JP); Hidetaka Kawamura, Yokohama (JP); Akihiro Taya, Yokohama (JP); Masanobu Ootsuka, Tokyo (JP); Takaharu Aotani, Toyko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/963,029

(22) Filed: Dec. 8, 2015

(65) Prior Publication Data
US 2016/0168406 A1    Jun. 16, 2016

(30) Foreign Application Priority Data
Dec. 12, 2014  (JP) ................................. 2014-252186

(51) Int. Cl.
*B41J 2/21* (2006.01)
*B41M 5/00* (2006.01)
(Continued)

(52) U.S. Cl.
CPC ........... *B41J 2/2107* (2013.01); *B41J 2/2114* (2013.01); *B41J 2/2117* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| | | | |
|---|---|---|---|
| 2004/0114013 A1* | 6/2004 | Doi ...................... | C09D 11/322 347/100 |
| 2009/0098312 A1* | 4/2009 | Goto .................... | B41J 2/17513 427/595 |

(Continued)

FOREIGN PATENT DOCUMENTS

| | | |
|---|---|---|
| JP | 2007146135 A | 6/2007 |
| JP | 2010064478 A | 3/2010 |

(Continued)

*Primary Examiner* — Manish S Shah
(74) *Attorney, Agent, or Firm* — Canon U.S.A. Inc., IP Division (57) ABSTRACT

An ink jet image recording method includes applying a first ink and a second ink onto a recording medium. The first ink contains a surfactant expressed by general formula (1) with a content of $V_1$ percent by mass relative to the total mass of the first ink and a liquid X being the portion other than the surfactant, and the second ink contains the surfactant with a content of $V_2$ percent by mass lower than $V_1$ relative to the total mass of the second ink and a liquid Y being the portion other than the surfactant. The liquids X and Y satisfy the specific requirement, and when liquids X' and Y' are prepared by adding the surfactant to the liquid X and Y, respectively, to a content of $V_2$ percent by mass relative to the total mass of the respective liquids, the liquids X' and Y' satisfy a specific requirement.

7 Claims, 1 Drawing Sheet

(51) Int. Cl.
*C09D 11/322* (2014.01)
*C09D 11/38* (2014.01)
*C09D 11/40* (2014.01)

(52) U.S. Cl.
CPC .......... *B41M 5/0023* (2013.01); *C09D 11/322* (2013.01); *C09D 11/38* (2013.01); *C09D 11/40* (2013.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; B41J 2/2117; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218

USPC .................................................. 347/95–105
See application file for complete search history.

(56) References Cited

U.S. PATENT DOCUMENTS

| | | | |
|---|---|---|---|
| 2010/0112219 A1* | 5/2010 | Yokohama | C09D 11/38 347/100 |
| 2013/0342604 A1 | 12/2013 | Yamashita | |
| 2014/0368593 A1* | 12/2014 | Kanasugi | B41J 2/0057 347/103 |

FOREIGN PATENT DOCUMENTS

| | | |
|---|---|---|
| WO | 2007/049782 A1 | 5/2007 |
| WO | 2014/135684 A1 | 9/2014 |

* cited by examiner

INK JET IMAGE RECORDING METHOD, INK SET, AND INK SET PREPARATION METHOD

BACKGROUND OF THE INVENTION

Field of the Invention

The present disclosure relates to an ink jet image recording method, an ink set, and an ink set preparation method.

Description of the Related Art

In the field of ink jet recording apparatuses and other image recording apparatuses, high speed recording has been demanded. When a high-speed recording is performed on a recording medium using a plurality of inks, an ink is applied in a region adjacent to a region where a previously applied different ink lies, before the previously applied ink is absorbed to the recording medium, and thus the inks in adjacent regions are often mixed. This is what is called a bleeding phenomenon. In order to suppress the bleeding phenomenon, the relationship among the surface tensions of inks has been studied (Japanese Patent Laid-Open Nos. 2010-064478 and 2007-146135).

Japanese Patent Laid-Open No. 2010-064478 discloses a technique in which the differences in surface tension among all the inks used are controlled to 1.0 mN/m or less. Japanese Patent Laid-Open No. 2007-146135 discloses a technique in which two inks of a black and another color that are likely to cause marked bleeding are controlled so that the black ink has a lower surface tension than the color ink.

SUMMARY OF THE INVENTION

The present disclosure provides an ink jet image recording method including applying a first ink and a second ink onto a recording medium. The first ink contains a surfactant expressed by general formula (1) with a content of $V_1$ percent by mass relative to the total mass of the first ink and a liquid X being the portion other than the surfactant, and the second ink contains the surfactant expressed by general formula (1) with a content of $V_2$ percent by mass lower than $V_1$ relative to the total mass of the second ink and a liquid Y being the portion other than the surfactant. General formula (1) is $R^1(CR^2R^3)_nCH_2CH_2(OCH_2CH_2)_mOH$, where $R^1$ represents fluorine or hydrogen, $R^2$ and $R^3$ each represent fluorine or hydrogen and at least one thereof is fluorine, n represents a numeral in the range of 1 to 30, and m represents a numeral in the range of 1 to 60.

The liquids X and Y are such that when the liquid X and Y are applied to adjacent regions on a recording medium having a water absorption coefficient of 0.1 mL·m$^{-2}$·ms$^{-1/2}$ to 0.3 mL·m$^{-2}$·ms$^{-1/2}$ so as to come into contact with each other, the liquid X flows to the region of the liquid Y.

The liquids X and Y are also such that when liquids X' and Y' are prepared by adding the surfactant expressed by general formula (1) to the liquid X and Y, respectively, to a surfactant content of $V_2$ percent by mass relative to the total mass of the respective liquids X' and Y', and are then applied to adjacent regions on a recording medium having a water absorption coefficient in the range of 0.1 mL·m$^{-2}$·ms$^{-1/2}$ to 0.3 mL·m$^{-2}$·ms$^{-1/2}$ so as to come into contact with each other, the liquid Y' flows to the region of the liquid X'.

According to the method of the disclosure, the bleeding phenomenon is suppressed, and the disclosure is also directed to an ink set capable of suppressing the bleeding phenomenon and a preparation method of such an ink set.

Further features of the present invention will become apparent from the following description of exemplary embodiments with reference to the attached drawings.

DESCRIPTION OF THE EMBODIMENTS

According to a study by the present inventors, the ink jet image recording methods disclosed in Japanese Patent Laid-Open Nos. 2010-064478 and 2007-146135 caused the bleeding phenomenon in some cases.

Accordingly, the present invention provides an ink jet image recording method, an ink set and an ink set preparation method that can suppress the bleeding phenomenon.

These will be described in detail using exemplary embodiments.

The present inventors investigated the cause of bleeding that occurs in the methods of the known art in which the surface tensions of the inks have a specific relationship thereamong. Although the known methods specify the relationship of the surface tensions of the inks in view of ink flow between different inks, the inventors found that another factor strongly influences the ink flow. More specifically, it was found that the ink flow between inks cannot be fully estimated only by the surface tensions of the inks, and that the ink flow between inks is not suppressed in some cases only by controlling the surface tensions of the inks.

The present inventors estimated the ink flow between inks by a method. The method will be described in detail below.

Two different liquids, a first liquid and a second liquid, are applied to adjacent regions on a recording medium so as to come into contact with each other, and it is visually observed which liquid flows into the region of the other liquid. In this instance, a recording medium having a water absorption coefficient Ka in the range of 0.1 mL/m$^2$·ms$^{1/2}$ to 0.3 mL/m$^2$·ms$^{1/2}$ is used as the recording medium. This is because the occurrence of flow between liquids cannot be easily seen on a highly liquid-absorbent recording medium such as plain paper, whereas liquid-nonabsorbent recording media such as glass and a vinyl chloride film can cause liquid flow in either direction and make it difficult to identify the direction of flow between liquids. The recording medium having a water absorption coefficient in the range of 0.1 mL/m$^2$·ms$^{1/2}$ to 0.3 mL/m$^{-2}$·ms$^{1/2}$ may be printing paper. Examples of such printing paper include OK Top Coat+ (manufactured by Oji Paper, Ka=0.18), Tokuhishi Art (manufactured by Mitsubishi Papers Mills, Ka=0.12), and Recycle Coat T-6 (manufactured by Nippon Paper, Ka=0.29).

Then, the present inventors studied the method for suppressing the bleeding phenomenon for the sets of inks in which the direction of ink flow therebetween had been known by the above method. As a result, the inventors reached a method of using a surfactant expressed by general formula (1): $R^1(CR^2R^3)_nCH_2CH_2(OCH_2CH_2)_mOH$ (where $R^1$ represents fluorine or hydrogen, $R^2$ and $R^3$ each represent fluorine or hydrogen and at least one thereof is fluorine, n represents a numeral in the range of 1 to 30, and m represents a numeral in the range of 1 to 60), and controlling the content of the surfactant.

More specifically, in the condition where liquids A' and B' prepared by adding a surfactant expressed by general formula (1) to each of liquids A and B satisfying requirement 1 (described later) so as to have a surfactant content of V (percent by mass) relative to the total mass of the corresponding liquid satisfy requirement 2 (described later), the liquid prepared by adding the surfactant to liquid A so as to have a surfactant content of $V_A$ (percent by mass) relative to the total mass of the resulting liquid is defined as a first ink, and the liquid prepared by adding the surfactant to liquid B so as to have a surfactant content of $V_B$ (percent by mass) is defined as a second ink.

Then, an ink set of the first ink and the second ink are prepared so that the surfactant content $V_A$ of the first ink is higher than the surfactant content $V_B$ of the second ink, and so that the surfactant content $V^B$ is higher than or equal to the surfactant content V with which liquids A' and B' satisfy requirement 2 (that is, so that $V_A > V_B \geq V$ holds true). The resulting ink set can suppress the bleeding phenomenon.

Requirement 1

When liquids A and B have been applied to adjacent regions on a recording medium having a water absorption coefficient Ka in the range of 0.1 mL/m$^2$·ms$^{1/2}$ to 0.3 mL/m$^2$·ms$^{1/2}$ so as to come into contact with each other, liquid A flows into the region of liquid B.

Requirement 2

When liquids A' and B' have been applied to adjacent regions on a recording medium having a water absorption coefficient Ka in the range of 0.1 mL/m$^2$·ms$^{1/2}$ to 0.3 mL/m$^2$·ms$^{1/2}$ so as to come into contact with each other, liquid B' flows into the region of liquid A'.

The inks of an ink set prepared by the above-described method have the following relationship. The content $V_1$ (percent by mass) of the surfactant expressed by general formula (1) in the first ink relative to the total mass of the first ink is higher than the content $V_2$ of the surfactant in the second ink relative to the total mass of the second ink; liquid X that is the portion of the first ink other than the surfactant and liquid Y that is the portion of the second ink other than the surfactant satisfy the following requirement 1; and liquids X' and Y' prepared by adding the surfactant to liquid X and Y, respectively, so that the resulting surfactant content comes to $V_2$ (percent by mass) relative to the total mass of the corresponding liquid satisfy the following requirement 2.

Requirement 1

When liquids X and Y have been applied to adjacent regions on a recording medium having a water absorption coefficient Ka in the range of 0.1 mL/m$^{-2}$·ms$^{-1/2}$ to 0.3 mL/m$^{-2}$·ms$^{-1/2}$ so as to come into contact with each other, liquid X flows into the region of liquid Y.

Requirement 2

When liquids X' and Y' have been applied to adjacent regions on a recording medium having a water absorption coefficient Ka in the range of 0.1 mL/m$^{-2}$·ms$^{-1/2}$ to 0.3 mL/m$^{-2}$·ms$^{-1/2}$ so as to come into contact with each other, liquid Y' flows into the region of liquid X'.

Accordingly, an ink jet image recording method including applying such first and second inks onto a recording medium can suppress the bleeding phenomenon.

The present inventors assume that this advantageous effect is produced by the following mechanism.

The present inventors found that for an ink set that causes flow between the inks in the above-described examination, the ink into which the other ink flows is required to have a higher content of the surfactant expressed by general formula (1) than the other ink.

The portions other than the surfactant expressed by general formula (1) of the finally prepared first and second inks are defined as liquid X and liquid Y, respectively; hence, the content of the surfactant expressed by general formula (1) is 0% by mass in each of the first and the second ink. In other words, the first ink is prepared by adding the surfactant expressed by general formula (1) to liquid X, and the second ink is prepared by adding the surfactant to liquid Y. When "liquid X flows into the region of liquid Y", that is, the liquids satisfy requirement 1, in an examination of flow between liquids X and Y in the above-described manner, the content of the surfactant in the second ink (prepared by adding the surfactant to liquid Y) relative to the total mass of the second ink is controlled to lower than the content of the surfactant in the first ink (prepared by adding the surfactant to liquid X) relative to the total mass of the first ink, and thus the bleeding phenomenon is suppressed.

Furthermore, the present inventors found that in order to suppress the bleeding phenomenon effectively, the ink having a lower surfactant content (second ink in the present embodiment) needs to satisfy a requirement in terms of the amount ($V_2$) of the surfactant.

More specifically, the ink having a lower surfactant content (second ink in the present embodiment) is prepared by adding such an amount of the surfactant that when Liquids X' and Y' prepared by adding the surfactant to liquid X and liquid B respectively so as to have a surfactant content V percent by mass relative to the total mass of the resulting liquid, the direction of flow between Liquids X' and Y' can be reversed from the direction of flow between liquids X and Y (hence, the surfactant content V2 of the second ink is higher than or equal to V). The present inventors found that the effect of suppressing the bleeding phenomenon can be produced effectively by this method. Surfactant content $V_2$ is desirably in the range of 0.5% by mass to 5.0% by mass. When $V_2$ is in this range, the ink can be ejected more stably by an ink jet method.

The present inventors also found through their study that it is more effective in suppressing the bleeding phenomenon to control the solids contents (pigment and resin) in the first and the second ink so as to be close. For example, the mass ratio of the solids content in the first ink to the solids content in the second ink may be in the range of 0.5 to 2.0.

Ink Jet Image Recording Method

The ink jet image recording method according to one or more embodiments of the present disclosure includes applying a first ink and a second ink onto a recording medium. The method may further include heating the recording medium onto which the inks have been applied, from the viewpoint of suppressing the bleeding phenomenon more effectively. The heating step will be described in detail later.

Figure 1:
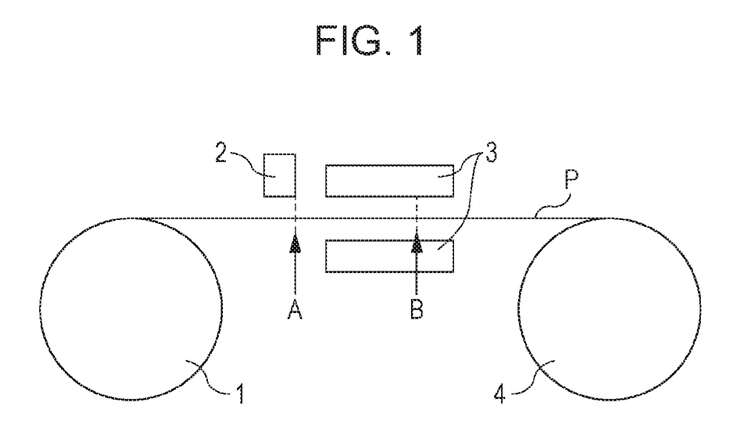
FIG. 1 is a schematic diagram of an image recording apparatus used in the ink jet image recording apparatus according to an embodiment of the disclosure.

FIG. 1 is a schematic diagram of an image recording apparatus used in the ink jet image recording apparatus according to an embodiment of the disclosure. In the image recording apparatus shown in FIG. 1, recording is performed using a rolled recording medium P and, then, the recording medium P is rolled again. The image recording apparatus includes a recording medium feeding unit 1 adapted to hold the rolled recording medium P and feed the medium, an ink applying unit 2 adapted to apply an ink onto the recording medium P, a heating device 3 adapted to heat the recording medium P, and a recording medium collecting unit 4 adapted to wind the recording medium P. The recording medium P is conveyed along a conveying path indicated by the solid line in FIG. 1 by a conveying device, such as a pair of rollers or a belt, and treated by those units or devices. The rolled recording medium P wound by the recording medium collecting unit 4 may be delivered to another apparatus for being cut into pieces of a desired size or for binding.

In an embodiment, the recording medium P may be conveyed at a speed of 50 m/min or more. Advantageously, the recording medium-conveying speed is 100 m/min or more.

Advantageously, a tension is placed on the recording medium P. Hence, the image recording apparatus desirably includes a tension applying device capable of generating a tension. For example, the conveying mechanism between the recording medium feeding unit 1 and the recording medium collecting unit 4 in FIG. 1 may be provided with a tension applying device capable of placing a tension on the recording medium or a tension controller capable of controlling the tension on the recording medium.

The tension placed on the recording medium is desirably 20 N/m or more. In other words, it is advantageous that inks be applied to a recording medium with a tension of 20 N/m or more placed thereon, in the step of applying the inks (hereinafter referred to as the ink application step). When a tension of 20 N/m is placed, the recording medium efficiently keeps the water component of the ink from swelling the fibers thereof. More advantageously, the tension placed on the recording medium is 30 N/m or more, such as 40 N/m to 100 N/m.

The ink application step and the heating step will now be described in detail.

(1) Ink Application Step

In the image recording method disclosed herein, the inks are applied onto the recording medium P in the ink application step. The ink application step is performed by an ink jet method. Hence, the image recording method disclosed herein incorporates an ink jet image recording method. The ink jet method may be what is called thermal ink jet method in which ink is ejected through an ejection opening of a recording head by applying thermal energy to the ink, or what is called piezoelectric ink jet method in which ink is ejected with a piezoelectric element through an ejection opening of a recording head.

Advantageously, one-pass recording is applied to the image recording method. The "one-pass recording" mentioned herein refers to a recording method in which recording of an image to be recorded in a unit area on a recording medium P is completed by one operation of relative movement between the recording head and the recording medium P. The "relative movement between the recording head and the recording medium P" may be a movement of the recording heat relative to a unit area of the recording medium P, conducted by moving the recording head, or a movement of the unit area of the recording medium P relative to the recording head, conducted by conveying the recording medium P. The image recording method disclosed herein is particularly advantageous for the case in which an image is recorded in an area corresponding to the length of the arrangement of ejection openings of the recording head by moving the recording head once in the width direction of the recording medium.

In the case of an ink jet image recording method incorporating the one-pass recording technique, it is advantageous that the content $V_2$ of the surfactant expressed by general formula (1) in the second ink be 0.8% by mass or more relative to the total mass of the second ink. When the surfactant content $V_2$ is in this level, blank dots do not easily occur in the resulting image even if the image is recorded by an ink jet image recording method incorporating the one-pass recording technique.

(2) Heating Step

In an embodiment of the present disclosure, the ink jet image recording method may include heating the recording medium P onto which the inks have been applied, as described above. The heating of the recording medium P may be performed on the front side (side on which the inks have been applied) and/or the back side of the medium P with a heater.

Advantageously, the heating is performed so that the surface temperature of the recording medium P onto which the inks have been applied comes to 70° C. or more, more advantageously 80° C. or more. From the viewpoint of preventing the recording medium P from being deformed by heat, the surface temperature is desirably 140° C. or less.

The phrase "the surface temperature of the recording medium P onto which the inks have been applied" refers to the temperature on the surface of the recording medium P at the position to which the recording medium is conveyed 0.5 second after the inks have been applied onto the recording medium P. For example, the surface temperature can be determined by measuring the temperature of the surface of record region X of the recording medium P at the position (position B in FIG. 1) to which record region X has been moved "V×0.5/60 (m)" at a speed of V (m/min) in the conveyance direction of the recording medium P from the position at which the ink has been applied (position A in FIG. 1). In the Examples disclosed herein, the surface temperature of the recording medium P was measured with a non-contact type thermometer, Digital Infrared Temperature Sensor FT-H20 (manufactured by Keyence) from a position of 10 cm from the surface of the recording medium P in a direction substantially perpendicular to the surface.

The heating may be continuously performed before the inks are applied until the inks have been applied. In the image recording method disclosed herein, the surface temperature of the recording medium P before the application of the inks is desirably 60° C. or less, irrespective of whether or not the medium is heated. More desirably, irrespective of whether or not it is heated, the surface temperature of the recording medium P before the application of the inks is 40° C. or less.

For heating the recording medium P in the heating step, the recording medium P may be pressed, for example, with a pressure roller. By pressing the recording medium P, the fixability of the image can be increased. In this instance, the pressing is not necessarily performed over the entire period of the heating step, and may be performed for a period of the heating step or in a plurality of stages. Additional heating may be performed after the heating step.

Ink Set

The ink set according to the present disclosure includes a first ink and a second ink. In an embodiment, the ink set may further include other inks. Although advantageous effects can be produced as long as at least two of a plurality of inks of the ink set have the above-described relationship, it is desirable that all the inks of the ink set have the above-described relationship between any two of the inks. For example, when the ink set includes a third ink in addition to the first and the second ink, it is desirable that the above-described relationship holds true not only between the first and the second ink, but also between the first and the third ink and between the second and the third ink.

The constituents of the first and the second ink will now be described, and the same applies to the other inks of the ink set.

Inks

Each of the first and the second ink contains a surfactant expressed by general formula (1). In addition, each ink may further contain a coloring material, a water-soluble organic solvent, water, and other constituents. Constituents that can be used in the first and the second ink will now be described.

Surfactant

Each of the inks disclosed herein contains a surfactant expressed by general formula (1):$R^1(CR^2R^3)_n$—$CH_2CH_2(OCH_2CH_2)_mOH$, where $R^1$ represents fluorine or hydrogen, $R^2$ and $R^3$ each represent fluorine or hydrogen and at least either $R^2$ or $R^3$ is fluorine, n represents a numeral in the range of 1 to 30, and m represents a numeral in the range of 1 to 60. The surfactant expressed by general formula (1) may be FS 3100 (produced by Du Pont) or Megafac F-444 (produced by DIC).

Advantageously, the surfactant has an HLB (hydrophile-lipophile balance) value in the range of 4 to 15 when measured by the Griffin method. More advantageously, the HLB value is in the range of 6 to 10.

In the first ink, the content of the surfactant expressed by general formula (1) may be in the range of 0.01% by mass to 3.00% by mass relative to the total mass of the first ink. In the second ink, the content of the surfactant may be in the range of 0.01% by mass to 3.00% by mass relative to the total mass of the second ink.

The first and the second ink each may further contain a nonionic surfactant other than the surfactant expressed by general formula (1). In this instance, the mass ratio of the surfactant expressed by general formula (1) to the nonionic surfactant in the ink is desirably in the range of 0.1 to 2. The nonionic surfactant may be acetylene glycol, or acetylene glycol to which ethylene oxide has been added.

Coloring Material

The first and the second ink may contain a coloring material. The coloring material may be a pigment or a dye and can be selected from among known pigments or dyes. Pigments are advantageous from the viewpoint of the water fastness of the resulting image. The coloring material content in the ink is may be in the range of 0.1% to 15.0% by mass, desirably in the range of 1.0% to 10.0% by mass, relative to the total mass of the ink.

The pigment used as the coloring material in the ink set may be of resin-dispersed type that is dispersed with a resin (resin-dispersed pigment using a resin dispersant, microencapsulated pigment including resin particles whose surfaces are coated with a resin, or resin-bound pigment containing particles whose surfaces are chemically bound to organic groups of a resin), or may be of self-dispersible type whose particles have hydrophilic groups at the surfaces thereof (self-dispersible pigment). Two or more pigments different in state of dispersion may be used in combination. Exemplary pigments include carbon black and organic pigments. The pigment may be composed of a single pigment or may contain two or more pigments.

The term self-dispersible pigment refers to a pigment whose molecule has at least one hydrophilic group binding to the surface of the particle thereof directly or with another atomic group (—R—) therebetween. Exemplary hydrophilic groups include —COOM, —$SO_3M$, —$PO_3HM$, and —$PO_3M_2$, where M represents hydrogen, alkali metals, ammonium, or organic ammonium. Alkali metals, such as lithium, sodium, and potassium, are more advantageous. Alkali metals allow the ink to be more stably ejected than ammonium or an organic ammonium. The hydrophilic group in the ink may be in the form of being dissociated in part or entirely. Exemplary atomic groups (—R—) include alkylene groups having a carbon number in the range of 1 to 12, a substituted or unsubstituted phenylene group, and a substituted or unsubstituted naphthylene group. The self-dispersible pigment that may be used in the inks may be an inorganic or an organic pigment, and can be selected from among known pigments.

The self-dispersible inorganic pigment may be prepared by introducing a hydrophilic group to the surfaces of particles of a known inorganic pigment, such as carbon black. Examples of the self-dispersible carbon black include CAB-O-JET 200, CAB-O-JET 300, CAB-O-JET 352K, and CAB-O-JET 400 (each produced by Cabot).

The self-dispersible organic pigment may be prepared by introducing a hydrophilic group to the surfaces of particles of a known organic pigment. Exemplary pigments are as below. As the pigment for a cyan ink, a copper phthalocyanine pigment is advantageous. Exemplary cyan pigments include C.I. Pigment Blues 1, 2, 3, 15, 15:2, 15:3, 15:4, 16, 22, and 60. Exemplary self-dispersible cyan pigments include CAB-O-JET 250C, CAB-O-JET 450C, and CAB-O-JET 554B (each produced by Cabot). As the pigment for a magenta ink, a quinacridone pigment is advantageous. Exemplary magenta pigments include C.I. Pigment Reds 5, 7, 12, 48, 48:1, 57, 112, 119, 122, 123, 146, 168, 184, 202, and 207. Exemplary self-dispersible magenta pigments include CAB-O-JET 260M, CAB-O-JET 265M, CAB-O-JET 465M, and CAB-O-JET 480V (each produced by Cabot). As the pigment for a yellow ink, an azo pigment is advantageous. Exemplary yellow pigments include C.I. Pigment Yellows 12, 13, 14, 16, 17, 74, 83, 93, 95, 97, 98, 114, 128, 129, 151, and 154. Exemplary self-dispersible yellow pigments include CAB-O-JET 270Y, CAB-O-JET 470Y, and CAB-O-JET 740Y (each produced by Cabot).

If a resin-dispersed pigment is used, a resin is used as a dispersant. The molecule of the resin used as the dispersant desirably has a hydrophilic site and a hydrophobic site. Examples of such a resin include copolymers of a monomer having a carboxy group, such as acrylic acid or methacrylic acid, and a monomer having an aromatic group, and urethane resins produced by polymerization using a diol having an anionic group, such as dimethylolpropionic acid. The resin used as a dispersant has an acid value, advantageously, in the range of 50 mg KOH/g to 300 mg KOH/g. The polystyrene-equivalent weight average molecular weight (Mw), measured by gel permeation chromatography (GPC), of the resin dispersant may be in the range of 1,000 to 15,000. The resin dispersant content in the ink may be in the range of 0.1% to 10.0% by mass and is desirably in the range of 0.2% to 4.0% by mass. The mass ratio of the resin dispersant to the pigment may be in the range of 0.1 to 1.0.

As the resin-dispersed pigment for a black ink, a carbon black is advantageous. Examples of the carbon black include Raven series 1060, 1080, 1170, 1200, 1250, 1255, 1500, 2000, 3500, 5250, 5750, 7000, 5000 ULTRAII, and 1190 ULTRAII (each produced by Carbon Columbia); Black Pearls L, MOGUL-L, Regal series 400R, 660R and 330R, and Monarch series 800, 880, 900, 1000, 1300 and 1400 (each produced by CABOT); Color Blacks FW1, FW2, FW200, 18, 5160 and 5170, Special Blacks 4, 4A and 6, and Printex series 35, U, 140U, V and 140V (each produced by Degussa); and No. 25, No. 33, No. 40, No. 47, No. 52, No. 900, No. 2300, No. 2600, MCF-88, MA 600, MA 7, MA 8, and MA 100 (each produced by Mitsubishi Chemical.

As the resin-dispersed pigment for a cyan ink, a copper phthalocyanine pigment is advantageous. Exemplary cyan pigments include C.I. Pigment Blues 1, 2, 3, 15, 15:2, 15:3, 15:4, 16, 22, and 60.

As the resin-dispersed pigment for a magenta ink, a quinacridone pigment is advantageous. Exemplary magenta pigments include C.I. Pigment Reds 5, 7, 12, 48, 48:1, 57, 112, 119, 122, 123, 146, 168, 184, 202, and 207.

As the resin-dispersed pigment for a yellow ink, an azo pigment is advantageous. Exemplary yellow pigments include C.I. Pigment Yellows 12, 13, 14, 16, 17, 74, 83, 93, 95, 97, 98, 114, 128, 129, 151, and 154.

If a dye is used as the coloring material, it is advantageous that the dye have an anionic group, such as a sulfo group or a carboxy group, and be therefore soluble in water. Examples of such a dye include color index-designated acid dyes, direct dyes and reactive dyes. A dye not designated by color index may be used as long as it has an anionic group such as a sulfo group or a carboxy group.

In an embodiment, the first ink may be a black ink, and the second ink may be any of a cyan ink, a magenta ink and a yellow ink. Such a combination of the inks makes inconspicuous the defects resulting from the bleeding phenomenon.

Aqueous Medium

In an embodiment, the inks may contain water and a water-soluble organic solvent. The water is desirably deionized water (ion exchanged water). The water-soluble organic solvent may be selected from among conventionally used water-soluble organic solvents. Exemplary water-soluble organic solvents include alcohols, glycols, alkylene glycols, polyethylene glycols, nitrogen-containing compounds, and sulfur-containing compounds. These water-soluble organic solvents may be used singly or in combination as required. Advantageously, the water-soluble organic solvent contains glycerin and diethylene glycerol.

Advantageously, the water-soluble organic solvent content in each of the first and the second ink is 30% by mass or more, more advantageously 40% by mass or more, relative to the total mass of the ink. Also, it is advantageously 90% by mass or less.

The water content in the ink is desirably in the range of 10% to 60% by mass relative to the total mass of the ink.

Other Constituents

The inks may further contain a water-soluble organic compound that is solid at room temperature, such as trimethylolpropane, trimethylolethane or any other polyhydric alcohol, or urea or a urea derivative, such as ethyleneurea, if necessary. Furthermore, the inks may optionally contain other additives, such as a surfactant, a pH adjuster, a corrosion inhibitor, a preservative, an antifungal agent, an antioxidant, an antireductant, an evaporation promoter, and a chelating agent.

Recording Medium

The recording medium used in the method disclosed herein may be selected from among conventionally used recording media. Examples of the recording medium include permeable media such as plain paper and glossy paper; less permeable recording media such as printing paper; impermeable recording media such as glass films and plastic films. Advantageously, the recording medium has a water absorption coefficient Ka of 0.3 mL/m$^2$·ms$^{1/2}$ or less.

Figure 2:
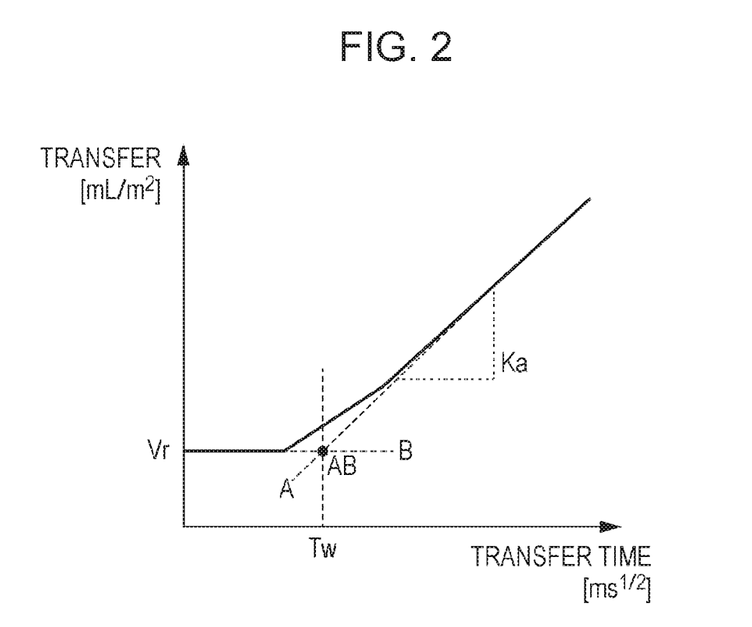
FIG. 2 is an exemplary absorption curve illustrating the absorption coefficient Ka of a recording medium.

The water absorption coefficient Ka of the recording medium used herein is determined by Bristow's Method specified in Standard No. 51 of JAPAN TAPPI, "Test Method for Liquid Absorption of Paper and Paperboard" (in Japanese). In Bristow's Method, liquid absorption is defined by wetting time Tw, absorption coefficient Ka (mL/m$^2$·ms$^{1/2}$) and roughness index Vr (mL/m$^2$). Since Bristow's Method is explained in many publications, details thereof are not described herein. FIG. 2 shows an exemplary absorption curve. This absorption curve is prepared according to a permeation model where liquid comes into contact with a recording medium and then starts permeating into the medium after a wetting time Tw has elapsed. The gradient of the straight line after the wetting time Tw has elapsed is the absorption coefficient Ka, which corresponds to the speed of permeation into the recording medium. In FIG. 2, the wetting time Tw is defined as the time period up to the intersection AB of approximate straight line A obtained for estimating the absorption coefficient Ka by the least-squares method and line B expressed by V=Vr (where V represents the volume of transferred liquid, and Vr represents roughness index). In the present disclosure, the liquid when absorption coefficient is discussed is water of 25° C. Hence, the absorption coefficient Ka discussed herein is the absorption coefficient for water of 25° C.

When the direction of flow between inks is examined in the present disclosure, "a recording medium having a water absorption coefficient Ka in the range of 0.1 mL/m$^2$·ms$^{1/2}$ to 0.3 mL/m$^2$·ms$^{1/2}$" is used. This is because the direction of flow between inks on such a recording medium can be easily identified by visual observation, and the recording medium to which the first and the second ink are applied is not limited to such a recording medium.

Also, the recording medium used in the ink jet image recording method disclosed herein is not limited to a rolled type as shown in FIG. 1, and may be a sheet cut into a specific dimensions. Rolled recording media are however advantageous because tension is easily applied thereto.

EXAMPLES

The present disclosure will be further described in detail with reference to Examples and Comparative Examples. The invention is however not limited to the following Examples. In the following Examples, "part(s)" is on a mass basis unless otherwise specified.

Example 1

Preparation of a Set of Inks Y-1, M-1, C-1 and K-1

Each of inks Y-1, M-1, C-1 and K-1 contains Capstone FS 3100 (produced by Du Pont) as the surfactant expressed by general formula (1). The HLB value (measured by the Griffin method) of Capstone FS 3100 is 9.8. The inks were prepared as below.

Preparation of Liquid Compositions Y-1, M-1, C-1 and K-1

First, liquid compositions Y-1, M-1, C-1 and K-1 are prepared as base liquids of inks Y-1, M-1, C-1 and K-1, respectively. Liquid compositions Y-1, M-1, C-1 and K-1 each contain the same constituents with the same contents as the intended inks to be finally prepared, except for not containing the surfactant. The constitutions of the liquid compositions are shown in Table 1. Materials were mixed and sufficiently dispersed in each other by stirring. Then, the mixture was filtered through a glass filter AP20 (manufacture by MILLIPORE), and a solution of potassium hydroxide in water was added to adjust the pH to 9.5.

TABLE 1

Preparation of Liquid Compositions (unit: percent by mass)

| Liquid composition No. | | Liquid composition Y-1 | Liquid composition M-1 | Liquid composition C-1 | Liquid composition K-1 |
|---|---|---|---|---|---|
| Pigment*[1] | Cab-o-jet 470Y | 33.3 | — | — | — |
| | Cab-o-jet 465M | — | 33.3 | — | — |
| | Cab-o-jet 450C | — | — | 33.3 | — |
| | Cab-o-jet 400 | — | — | — | 33.3 |
| Polyurethane resin dispersion*[2] | | 17.1 | 17.1 | 17.1 | 17.1 |
| Glycerin | | 20.0 | 20.0 | 20.0 | 20.0 |
| Polyethylene glycol*[3] | | 6.0 | 6.0 | 6.0 | 6.0 |
| Ion exchanged water | | 23.6 | 23.6 | 23.6 | 23.6 |

*[1]Each is a self-dispersible pigment dispersion produced by Cabot (pigment content: 15% by mass)
*[2]Takelac W5661 (resin content: 35% by mass)
*[3]Number average molecular weight: 1,000 Directions of Flow between Liquid Compositions Y-1, M-1, C-1 and K-1

Directions of flow between any two of the liquid compositions Y-1, M-1, C-1 and K-1 are shown in Table 2. The flow directions were identified as below.

An ink jet recording apparatus including a piezoelectric ink jet head KJ4 for one-pass recording (manufactured by KYOCERA, nozzle density: 600 dpi) was charged with the liquid compositions. Then, an image was recorded on a recording medium OK Top Coat+ (manufactured by Oji Paper, basis weight: 105 g/m$^2$) having a water absorption coefficient Ka in the range of 0.1 mL/m$^2$·ms$^{1/2}$ to 0.3 mL/m$^2$·ms$^{1/2}$ so that solid image portions (recording duty: 100%) would be formed in adjacent regions, using two of the liquid compositions. The recording was performed under the conditions of 23° C. in temperature, 55% in humidity, 40 kHz in ink ejection frequency, 100 m/min in recording medium-conveying speed, and about 12 pL/dot in ejection volume. When the above-described ink jet recording apparatus is used, a duty of 100% is a condition such that an ink droplet of about 12 ng is applied to a unit area of 1/600 inch×1/600 inch at a resolution of 600 dpi×600 dpi.

The resulting image thus recorded was allowed to stand at room temperature for 24 hours, and the boundary of the solid image portions was visually observed for identifying the direction of flow between the liquids.

TABLE 2

Directions of Flow between Liquid Compositions

| Flow Into | Flow From |
|---|---|
| Liquid composition K-1 | Liquid composition Y-1 |
| | Liquid composition M-1 |
| | Liquid composition C-1 |
| Liquid composition C-1 | Liquid composition Y-1 |
| | Liquid composition M-1 |
| Liquid composition M-1 | Liquid composition Y-1 |

Determination of Surfactant Contents of Inks Y-1, M-1, C-1 and K-1

The surfactant contents $V_Y$, $V_M$, $V_C$ and $V_K$ (parts) of respective inks Y-1, M-1, C-1 and K-1 relative to the total (100 parts) of the liquid composition and the surfactant (that is, the entirety of the ink) are set so as to satisfy the relationship: $V_K < V_C < V_M < V_Y$ in view of the result of the identification of flow direction and requirement 1.

(1) Determination of $V_K$

Liquid compositions Y'-1, M'-1, C'-1 and K'-1 (each 100 parts in total) are prepared by adding the surfactant to the respective liquid compositions Y-1, M-1, C-1 and K-1 to a content of $V_K$ (part(s)). Specifically, the resulting liquid compositions are as follows:

Liquid composition Y'-1=liquid composition Y-1 [(100–$V_K$) parts]+surfactant [$V_K$ parts]

Liquid composition M'-1=liquid composition M-1 [(100–$V_K$) parts]+surfactant [$V_K$ parts]

Liquid composition C'-1=liquid composition C-1 [(100–$V_K$) parts]+surfactant [$V_K$ parts]

Liquid composition K'-1=liquid composition K-1 [(100–$V_K$) parts]+surfactant [$V_K$ parts]

The surfactant content $V_K$ at which liquid compositions Y'-1, M'-1, C'-1 and K'-1 satisfy requirement 2, or Table 3, was 1.0 part. The directions of flow between liquids were identified in the same manner as above.

TABLE 3

Directions of Flow between Liquid Compositions

| Flow Into | Flow From |
|---|---|
| Liquid composition Y'-1 | Liquid composition K'-1 |
| Liquid composition M'-1 | |
| Liquid composition C'-1 | |

(2) Determination of $V_C$

The surfactant contents $V_Y$, $V_M$ and $V_C$ (part(s)) of inks Y-1, M-1 and C-1 are set so as to satisfy the relationship: $1.0 < V_C < V_M < V_Y$.

Liquid compositions Y"-1, M"-1 and C"-1 (each 100 parts in total) are prepared by adding the surfactant to the respective liquid compositions Y-1, M-1 and C-1 to a content of $V_C$ (part(s)). Specifically, the resulting liquid compositions are as follows:

Liquid composition Y"-1=liquid composition Y-1 [(100–$V_C$) part(s)]+surfactant [$V_C$ part(s)]

Liquid composition M"-1=liquid composition M-1 [(100–$V_C$) part(s)]+surfactant [$V_C$ part(s)]

Liquid composition C"-1=liquid composition C-1 [(100–$V_C$) part(s)]+surfactant [$V_C$ parts]

The surfactant content $V_C$ at which liquid compositions Y"-1, M"-1 and C"-1 satisfy requirement 2, or Table 4, was 1.2 parts. The directions of flow between liquids were identified in the same manner as above.

TABLE 4

Directions of Flow between Liquid Compositions

| Flow Into | Flow From |
|---|---|
| Liquid composition Y"-1 | Liquid composition C"-1 |
| Liquid composition M"-1 | |

(3) Determination of $V_Y$ and $V_M$

The surfactant contents $V_Y$ and $V_M$ of inks Y-1 and M-1, which were determined in the same manner as in the determinations of (1) and (2), were 1.7 parts and 1.6 parts, respectively.

Preparation of Set of Inks Y-1, M-1, C-1 and K-1

Inks Y-1, M-1, C-1 and K-1 were prepared by adding Capstone FS 3100 (produced by Du Pont) as the surfactant expressed by general formula (1) to each of the liquid compositions Y-1, M-1, C-1 and K-1 according to the surfactant contents determined above. Specifically, the constitutions of the inks are as follows:

Ink Y-1=liquid composition Y-1 (98.3 parts)+FS 3100 (1.7 parts)
Ink M-1=liquid composition M-1 (98.4 parts)+FS 3100 (1.6 parts)
Ink C-1=liquid composition C-1 (98.8 parts)+FS 3100 (1.2 parts)
Ink K-1=liquid composition K-1 (99.0 parts)+FS 3100 (1.0 part)

Comparative Example 1

Preparation of a set of inks Y-2, M-2, C-2 and K-2

Each of inks Y-2, M-2, C-2 and K-2 contains Capstone FS 3100 (produced by Du Pont) as the surfactant expressed by general formula (1).

The inks of the ink set were prepared by adding the surfactant Capstone FS 3100 to each of liquid compositions Y-1, M-1, C-1 and K-1 used in Example 1 so as to have the constitution: liquid composition (98.3 parts)+surfactant (1.7 parts). Specifically, the constitutions of the inks are as follows:

Ink Y-2=liquid composition Y-1 (98.3 parts)+FS 3100 (1.7 parts)
Ink M-2=liquid composition M-1 (98.3 parts)+FS 3100 (1.7 parts)
Ink C-2=liquid composition C-1 (98.3 parts)+FS 3100 (1.7 parts)
Ink K-2=liquid composition K-1 (98.3 parts)+FS 3100 (1.7 part)

Comparative Example 2

Preparation of a set of inks Y-3, M-3, C-3 and K-3

Inks Y-3, M-3, C-3 and K-3 each contain an acetylene glycol-based surfactant Acetylenol E100 (produced by Kawaken Fine Chemicals) instead of the surfactant expressed by general formula (1).

The inks of the ink set were prepared by adding the acetylene glycol-based surfactant Acetylenol E100 (hereinafter abbreviated as. AE100) to each of liquid compositions Y-1, M-1, C-1 and K-1 used in Example 1 to the same surfactant content as in Example 1. Specifically, the constitutions of the inks are as follows:

Ink Y-3=liquid composition Y-1 (98.3 parts)+AE100 (1.7 parts)
Ink M-3=liquid composition M-1 (98.4 parts)+AE100 (1.6 parts)
Ink C-3=liquid composition C-1 (98.8 parts)+AE100 (1.2 parts)
Ink K-3=liquid composition K-1 (99.0 parts)+AE100 (1.0 part)

Evaluations

In each evaluation, rating A represents a good result, and ratings B and C represent unacceptable results.

Occurrence of Bleeding Phenomenon

For the combinations of inks shown in Table 5, an image formed of solid image portions with two inks (each recording duty: 100%) was recorded on OK Top Coat+ in the same manner as in the above-described examination of liquid flow. After the image was stored at room temperature for 24 hours, the distance from the boundary between two inks in the image to the head of the ink that had flowed into the other ink was measured. The results were rated according to the criteria for the evaluation of the bleeding phenomenon. The results are shown in Table 5.

A: The distance of ink flow was 0.2 mm or less.
B: The distance of ink flow was in the range of larger than 0.2 mm to 1.0 mm.
C: The distance of ink flow was larger than 1.0 mm.

Occurrence of Beading Phenomenon

In general, when a beading phenomenon occurs, the resulting solid pattern becomes uneven in shade. The images of solid image portions formed for the above-described evaluation were checked for unevenness in shade for evaluating the beading phenomenon by visual observation. The rating criteria were as follows. The results are shown in Table 5.

A: Unevenness in shade was not observed.
B: Unevenness in shade was observed. In addition, the recording medium was viewed through the image.

TABLE 5

Combinations of inks and Evaluation Results

| | | | Rating | |
|---|---|---|---|---|
| Example No. | Combination of inks | | Bleeding | Beading |
| Example 1 | Ink Y-1 | Ink K-1 | A | A |
| | Ink M-1 | Ink K-1 | A | A |
| | Ink C-1 | Ink K-1 | A | A |
| | Ink Y-1 | Ink M-1 | A | A |
| | Ink Y-1 | Ink C-1 | A | A |
| | Ink M-1 | Ink C-1 | A | A |
| Comparative | Ink Y-2 | Ink K-2 | C | A |
| Example 1 | Ink M-2 | Ink K-2 | C | A |
| | Ink C-2 | Ink K-2 | B | A |
| | Ink Y-2 | Ink M-2 | B | A |
| | Ink Y-2 | Ink C-2 | C | A |
| | Ink M-2 | Ink C-2 | B | A |
| Comparative | Ink Y-3 | Ink K-3 | B | B |
| Example 2 | Ink M-3 | Ink K-3 | B | B |
| | Ink C-3 | Ink K-3 | B | B |
| | Ink Y-3 | Ink M-3 | B | B |
| | Ink Y-3 | Ink C-3 | B | B |
| | Ink M-3 | Ink C-3 | B | B |

Example 2

Preparation of a Set of Inks Y-4, M-4, C-4 and K-4

Each of inks Y-4, M-4, C-4 and K-4 contains Capstone FS 3100 (produced by Du Pont) as the surfactant expressed by general formula (1). The inks were prepared as below.

Preparation of Liquid Compositions Y-4, M-4, C-4 and K-4

First, liquid compositions Y-4, M-4, C-4 and K-4 are prepared as base liquids of inks Y-4, M-4, C-4 and K-4, respectively. Liquid compositions Y-4, M-4, C-4 and K-4 each contain the same constituents with the same contents as the intended inks to be finally prepared, except for not containing the surfactant. The constitutions of the liquid compositions are shown in Table 6. Materials were mixed and sufficiently dispersed in each other by stirring. Then, the mixture was filtered through a glass filter AP20 (manufacture by MILLIPORE), and a solution of potassium hydroxide in water was added to adjust the pH to 9.5.

TABLE 6

Preparation of Liquid Compositions (unit: percent by mass)

| Liquid composition No. | | Liquid composition Y-4 | Liquid composition M-4 | Liquid composition C-4 | Liquid composition K-4 |
|---|---|---|---|---|---|
| Pigment | Yellow pigment dispersion liquid | 40.0 | — | — | — |
| | Magenta pigment dispersion liquid | — | 40.0 | — | — |
| | Cyan pigment dispersion liquid | — | — | 40.0 | — |
| | Black pigment dispersion liquid | — | — | — | 40.0 |
| | Glycerin | 23.0 | 23.0 | 23.0 | 23.0 |
| | Diethylene glycol | 23.0 | 23.0 | 23.0 | 23.0 |
| | Capstone FS 3100 | 0.3 | 0.3 | 0.3 | 0.3 |
| | Ion exchanged water | 13.7 | 13.7 | 13.7 | 13.7 |

The pigment dispersion liquids shown in Table 6 were prepared as below.

Preparation of Black Pigment Dispersion Liquid

A 500 mL recovery flask equipped therein with a mechanical stirrer was placed in the bath of an ultrasonic generator, and 2.0 g of a vinyl resin having an acid value of 170 mg KOH/g and 120 mL of tetrahydrofuran were stirred in the flask while ultrasonic waves were applied. Another container was charged with 10 g of a carbon black Color Black FW 18PS (produced by Degussa), and 120 mL of tetrahydrofuran was added. The materials were stirred with a planetary stirrer (manufactured by Kurabo) until the surfaces of the pigment particles were fully wet by the solvent. Then, the mixture was added into the 500 mL recovery flask and mixed with the vinyl resin.

A solution of potassium hydroxide in water was added so as to neutralize 100% of the vinyl resin for phase inversion. Then, after premixing for 60 minutes, the materials were dispersed in each other for 2 hours with Nanomizer NM2-L200AR (available from Yoshida Kikai). After the tetrahydrofuran was removed from the resulting dispersion liquid using a rotary evaporator, the concentration of the dispersion liquid was adjusted with ion-exchanged water. Thus, a black pigment dispersion liquid with a pigment content of 10% by mass was prepared.

Preparation of Yellow Pigment Dispersion Liquid

A yellow pigment dispersion liquid with a pigment content of 10% by mass was prepared in the same manner as the black pigment dispersion liquid, except for using a vinyl resin having an acid value of 80 mg KOH/g instead of the vinyl resin having an acid value of 170 mg KOH/g and C.I. Pigment Yellow 74 instead of the carbon black Color Black FW18PS.

Preparation of Magenta Pigment Dispersion Liquid

A magenta pigment dispersion liquid with a pigment content of 10% by mass was prepared in the same manner as the yellow pigment dispersion liquid, except for using C.I. Pigment Red 122 instead of C.I. Pigment Yellow 74. Preparation of Cyan Pigment Dispersion Liquid A cyan pigment dispersion liquid with a pigment content of 10.0% by mass was prepared in the same manner as the black pigment dispersion liquid, except for using C.I. Pigment Blue 15:3 instead of the carbon black Color Black FW18PS.

Direction of Flow between Liquid Compositions Y-4, M-4, C-4 and K-4

Directions of flow between any two of the liquid compositions Y-4, M-4, C-4 and K-4 are shown in Table 7. The directions of liquid flow were checked in the same manner as above.

TABLE 7

Directions of Flow between Liquid Compositions

| Flow Into | Flow From |
|---|---|
| Liquid composition K-4 | Liquid composition Y-4 |
| | Liquid composition M-4 |
| | Liquid composition C-4 |
| Liquid composition C-4 | Liquid composition Y-4 |
| | Liquid composition M-4 |
| Liquid composition M-4 | Liquid composition Y-4 |

Determination of Surfactant Contents of Inks Y-4, M-4, C-4 and K-4

The surfactant contents $V_Y$, $V_M$, $V_C$ and $V_K$ (parts) in respective inks Y-4, M-4, C-4 and K-4 relative to the total (100 parts) of the liquid composition and the surfactant (that is, the entirety of the ink) are set so as to satisfy the relationship: $V_K < V_C < V_M < V_Y$ in view of the results of the directions of liquid flow and requirement 1.

(1) Determination of $V_K$

Liquid compositions Y'-4, M'-4, C'-4 and K'-4 (100 parts in total) are prepared by adding the surfactant to the respective liquid compositions Y-4, M-4, C-4 and K-4 to a content of $V_K$ (part(s)). Specifically, the resulting liquid compositions are as follows:

Liquid composition Y'-4=liquid composition Y-4 [(100–$V_K$) part(s)]+surfactant [$V_K$ part(s)]

Liquid composition M'-4=liquid composition M-4 [(100–$V_K$) part(s)]+surfactant [$V_K$ part(s)]

Liquid composition C'-4=liquid composition C-4 [(100−$V_K$) part(s)]+surfactant [$V_K$ part(s)]
Liquid composition K'-4=liquid composition K-4 [(100−$V_K$) part(s)]+surfactant [$V_K$ part(s)]

The surfactant content $V_K$ at which liquid compositions Y'-4, M'-4, C'-4 and K'-4 satisfy requirement 2, or Table 8, was 0.8 part. The directions of flow between liquids were identified in the same manner as above.

TABLE 8

Directions of Flow between Liquids Compositions

| Flow Into | Flow From |
|---|---|
| Liquid composition Y'-4 | Liquid composition K'-4 |
| Liquid composition M'-4 | |
| Liquid composition C'-4 | |

(2) Determination of $V_Y$ and $V_M$ and $V_C$

The surfactant contents $V_Y$, $V_M$ and $V_C$ of inks Y-4, M-4 and C-4, which were determined in the same manner as in the determination of (1), were 1.6 parts, 1.4 parts and 1.1 parts, respectively.

Preparation of Set of Inks Y-4, M-4, C-4 and K-4

Inks Y-4, M-4, C-4 and K-4 were prepared by adding Capstone FS 3100 (produced by Du Pont) as the surfactant expressed by general formula (1) to each of the liquid compositions Y-4, M-4, C-4 and K-4 according to the surfactant contents determined above. Specifically, the constitutions of the inks are as follows:
Ink Y-4=liquid composition Y-4 (98.4 parts)+FS 3100 (1.6 parts)
Ink M-4=liquid composition M-4 (98.6 parts)+FS 3100 (1.4 parts)
Ink C-4=liquid composition C-4 (98.9 parts)+FS 3100 (1.1 parts)
Ink K-4=liquid composition K-4 (99.2 parts)+FS 3100 (0.8 part)

Comparative Example 3

Preparation of a set of inks Y-5, M-5, C-5 and K-5

Each of inks Y-5, M-5, C-5 and K-5 contains Capstone FS 3100 (produced by Du Pont) as the surfactant expressed by general formula (1).

The inks of the ink set were prepared by adding the surfactant Capstone FS 3100 to each of liquid compositions Y-4, M-4, C-4 and K-4 used in Example 1 so as to have the constitution: liquid composition (98.4 parts)+surfactant (1.6 parts). Specifically, the constitutions of the inks are as follows:
Ink Y-5=liquid composition Y-4 (98.4 parts)+FS 3100 (1.6 parts)
Ink M-5=liquid composition M-4 (98.4 parts)+FS 3100 (1.6 parts)
Ink C-5=liquid composition C-4 (98.4 parts)+FS 3100 (1.6 parts)
Ink K-5=liquid composition K-4 (98.4 parts)+FS 3100 (1.6 part)

Comparative Example 4

Preparation of a set of inks Y-6, M-6, C-6 and K-6

Inks Y-6, M-6, C-6 and K-6 each contain an acetylene glycol-based surfactant Acetylenol E100 (produced by Kawaken Fine Chemicals) instead of the surfactant expressed by general formula (1).

The inks of the ink set were prepared by adding the acetylene glycol-based surfactant Acetylenol E100 (hereinafter abbreviated as AE100) to each of liquid compositions Y-4, M-4, C-4 and K-4 used in Example 2 to the same surfactant content as in Example 1. Specifically, the constitutions of the inks are as follows:
Ink Y-6=liquid composition Y-4 (98.4 parts)+AE100 (1.6 parts)
Ink M-6=liquid composition M-4 (98.6 parts)+AE100 (1.4 parts)
Ink C-6=liquid composition C-4 (98.9 parts)+AE100 (1.1 parts)
Ink K-6=liquid composition K-4 (99.2 parts)+AE100 (0.8 part)

Evaluations

The occurrences of the bleeding phenomenon and the beading phenomenon were evaluated in the same manner as above. The results are shown in Table 9.

TABLE 9

Combinations of inks and Evaluation Results

| Example No. | Combination of inks | | Rating | |
|---|---|---|---|---|
| | | | Bleeding | Beading |
| Example 2 | Ink Y-4 | Ink K-4 | A | A |
| | Ink M-4 | Ink K-4 | A | A |
| | Ink C-4 | Ink K-4 | A | A |
| | Ink Y-4 | Ink M-4 | A | A |
| | Ink Y-4 | Ink C-4 | A | A |
| | Ink M-4 | Ink C-4 | A | A |
| Comparative Example 3 | Ink Y-5 | Ink K-5 | C | A |
| | Ink M-5 | Ink K-5 | C | A |
| | Ink C-5 | Ink K-5 | B | A |
| | Ink Y-5 | Ink M-5 | B | A |
| | Ink Y-5 | Ink C-5 | C | A |
| | Ink M-5 | Ink C-5 | B | A |
| Comparative Example 4 | Ink Y-6 | Ink K-6 | C | B |
| | Ink M-6 | Ink K-6 | C | B |
| | Ink C-6 | Ink K-6 | C | B |
| | Ink Y-6 | Ink M-6 | B | B |
| | Ink Y-6 | Ink C-6 | C | B |
| | Ink M-6 | Ink C-6 | B | B |

Example 3

Preparation of a Set of Inks Y-7, M-7, C-7 and K-7

Surfactant contents $V_{Y2}$, $V_{M2}$, $V_{C2}$ and $V_{K2}$ of inks Y-7, M-7, C-7 and K-7 (part(s)) are determined, respectively, using liquid compositions Y-1, M-1, C-1 and K-1 used in Example 1.

(1) Determination of $V_{K2}$

Liquid compositions Y'-7, M'-7, C'-7 and K'-7 (each 100 parts in total) are prepared by adding Capstone FS 3100 as the surfactant to the respective liquid compositions Y-1, M-1, C-1 and K-1 to a content of $V_{K2}$ (part(s)).

Specifically, the resulting liquid compositions are as follows:
Liquid composition Y'-7=liquid composition Y-1 [(100−$V_{K2}$) part(s)]+surfactant [$V_{K2}$ part(s)]
Liquid composition M'-7=liquid composition M-1 [(100−$V_{K2}$) part(s)]+surfactant [$V_{K2}$ part(s)]
Liquid composition C'-7=liquid composition C-1 [(100−$V_{K2}$) part(s)]+surfactant [$V_{K2}$ part(s)]

Liquid composition K'-7=liquid composition K-1 [(100−$V_{K2}$) part(s)]+surfactant [$V_{K2}$ part(s)]

The surfactant content $V_{K2}$ at which liquid compositions Y'-7, M'-7, C'-7 and K'-7 satisfy requirement 2, or Table 10, was 1.5 parts. The directions of liquid flow were checked in the same manner as above.

TABLE 10

| Direction of Flow between Liquid Compositions | |
|---|---|
| Flow into | Flow from |
| Liquid composition Y'-7<br>Liquid composition M'-7<br>Liquid composition C'-7 | Liquid composition K'-7 |

(2) Determination of $V_{Y2}$, $V_{M2}$ and $V_{C2}$

The surfactant contents $V_{Y2}$, $V_{M2}$ and $V_{C2}$ of inks Y-7, M-7 and C-7, which were determined in the same manner as in the determination of (1), were 2.3 parts, 2.0 parts and 1.7 parts, respectively.

Preparation of Set of Inks Y-7, M-7, C-7 and K-7

Inks Y-7, M-7, C-7 and K-7 were prepared by adding Capstone FS 3100 (produced by Du Pont) as the surfactant expressed by general formula (1) to each of the liquid compositions Y-1, M-1, C-1 and K-1 according to the surfactant contents determined above. Specifically, the constitutions of the inks are as follows:

Ink Y-7=liquid composition Y-1 (97.5 parts)+FS 3100 (2.5 parts)
Ink M-7=liquid composition M-1 (98.0 parts)+FS 3100 (2.0 parts)
Ink C-7=liquid composition C-1 (98.3 parts)+FS 3100 (1.7 parts)
Ink K-7=liquid composition K-1 (98.5 parts)+FS 3100 (1.5 parts)

Comparative Example 5

Preparation of a set of inks Y-8, M-8, C-8 and K-8

Each of inks Y-8, M-8, C-8 and K-8 contains Capstone FS 3100 (produced by Du Pont) as the surfactant expressed by general formula (1).

The inks of the ink set were prepared by adding the surfactant Capstone FS 3100 to each of liquid compositions Y-1, M-1, C-1 and K-1 used in Example 3 so as to have the constitution: liquid composition (97.5 parts)+surfactant (2.5 parts). Specifically, the constitutions of the inks are as follows:

Ink Y-8=liquid composition Y-1 (97.5 parts)+FS 3100 (2.5 parts)
Ink M-8=liquid composition M-1 (97.5 parts)+FS 3100 (2.5 parts)
Ink C-8=liquid composition C-1 (97.5 parts)+FS 3100 (2.5 parts)
Ink K-8=liquid composition K-1 (97.5 parts)+FS 3100 (2.5 parts)

Comparative Example 6

Preparation of a set of inks Y-9, M-9, C-9 and K-9

Inks Y-9, M-9, C-9 and K-9 each contain an acetylene glycol-based surfactant Acetylenol E100 (produced by Kawaken Fine Chemicals) instead of the surfactant expressed by general formula (1).

The inks of the ink set were prepared by adding the acetylene glycol-based surfactant Acetylenol E100 (hereinafter abbreviated as AE100) to each of compositions Y-1, M-1, C-1 and K-1 used in Example 3 to the same surfactant content as in Example 1. Specifically, the constitutions of the inks are as follows:

Ink Y-9=liquid composition Y-1 (97.5 parts)+AE100 (2.5 parts)
Ink M-9=liquid composition M-1 (98.0 parts)+AE100 (2.0 parts)
Ink C-9=liquid composition C-1 (98.3 parts)+AE100 (1.7 parts)
Ink K-9=liquid composition K-1 (98.5 parts)+AE100 (1.5 part)

Evaluations

The occurrences of the bleeding phenomenon and the beading phenomenon were evaluated in the same manner as above. The results are shown in Table 11.

TABLE 11

Combinations of Inks and Evaluation Results

| Example No. | Combination of inks | | Rating | |
|---|---|---|---|---|
| | | | Bleeding | Beading |
| Example 3 | Ink Y-7 | Ink K-7 | A | A |
| | Ink M-7 | Ink K-7 | A | A |
| | Ink C-7 | Ink K-7 | A | A |
| | Ink Y-7 | Ink M-7 | A | A |
| | Ink Y-7 | Ink C-7 | A | A |
| | Ink M-7 | Ink C-7 | A | A |
| Comparative Example 5 | Ink Y-8 | Ink K-8 | C | A |
| | Ink M-8 | Ink K-8 | C | A |
| | Ink C-8 | Ink K-8 | B | A |
| | Ink Y-8 | Ink M-8 | B | A |
| | Ink Y-8 | Ink C-8 | C | A |
| | Ink M-8 | Ink C-8 | B | A |
| Comparative Example 6 | Ink Y-9 | Ink K-9 | C | B |
| | Ink M-9 | Ink K-9 | C | B |
| | Ink C-9 | Ink K-9 | B | B |
| | Ink Y-9 | Ink M-9 | C | B |
| | Ink Y-9 | Ink C-9 | C | B |
| | Ink M-9 | Ink C-9 | C | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-252186, filed Dec. 12, 2014, which is hereby incorporated by reference herein in its entirety.

What is claimed is:

1. An ink jet image recording method, comprising:
applying a first aqueous ink and a second aqueous ink onto a recording medium,
wherein the first aqueous ink contains a surfactant expressed by general formula (1) with a content of $V_1$ percent by mass relative to the total mass of the first aqueous ink and a liquid X being the portion other than the surfactant, and the second aqueous ink contains the surfactant expressed by general formula (1) with a content of $V_2$ percent by mass lower than $V_1$ relative to the total mass of the second aqueous ink and a liquid Y being the portion other than the surfactant,
wherein general formula (1) is $R^1(CR^2R^3)_n CH_2CH_2(OCH_2CH_2)_m OH$, where $R^1$ represents fluorine or hydrogen, $R^2$ and $R^3$ each represent fluorine or hydrogen and at least one thereof is fluorine, n represents a numeral in the range of 1 to 30, and m represents a numeral in the range of 1 to 60, wherein the liquids X and Y are such that when the liquid X and Y are applied to adjacent regions on a recording medium having a water absorption coefficient in the range of $0.1\ mL \cdot m^{-2} \cdot ms^{-1/2}$ to $0.3\ mL \cdot m^{-2} \cdot ms^{-1/2}$ so as to come into contact with each other, the liquid X flows to the region of the liquid Y, and wherein when liquids X' and Y' are prepared by adding the surfactant expressed by general formula (1) to the liquid X and Y, respectively, to a content of $V_2$ percent by mass relative to the total mass of the respective liquids X' and Y', and are then applied to adjacent regions on a recording medium having a water absorption coefficient in the range of $0.1\ mL \cdot M^{-2} \cdot ms^{-1/2}$ to $0.3\ mL \cdot M^{-2} \cdot ms^{-1/2}$ so as to come into contact with each other, the liquid Y' flows to the region of the liquid X', and $V_2$ is 0.5% by mass or more and 5.0% by mass or less relative to the total mass of the second aqueous ink.

2. The ink jet image recording method according to claim 1, wherein the first aqueous ink and the second aqueous ink each contain a water-soluble organic solvent with a content of 30% by mass or more relative to the total mass of the corresponding ink.

3. The ink jet image recording method according to claim 1, further comprising heating the recording medium on which the inks have been applied.

4. The ink jet image recording method according to claim 3, wherein the heating is performed so that the recording medium has a surface temperature of 70° C. or more.

5. The ink jet image recording method according to claim 1, further comprising conveying the recording medium at a speed of 50 m/min or more.

6. The ink jet image recording method according to claim 1, wherein the recording medium to which the first and the second aqueous ink are applied has a water absorption coefficient of $0.3\ mL/m^2 \cdot ms^{1/2}$ or less.

7. The ink jet image recording method according to claim 1, wherein the second aqueous ink is a black ink, and the first aqueous ink is a cyan ink, a magenta ink, or a yellow ink.

* * * * *